United States Patent
Snodgrass

(10) Patent No.: US 8,422,381 B1
(45) Date of Patent: Apr. 16, 2013

(54) SYSTEM AND METHOD FOR IMPROVED JAMMING RESISTANCE FOR HIGH THROUGHPUT POINT TO POINT COMMUNICATION NETWORKS

(75) Inventor: Timothy E. Snodgrass, Palo, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1359 days.

(21) Appl. No.: 11/705,570

(22) Filed: Feb. 12, 2007

(51) Int. Cl.
*H04L 12/26* (2006.01)
*H04W 4/00* (2009.01)
*H04B 7/216* (2006.01)

(52) U.S. Cl.
USPC .............. 370/252; 370/329; 370/342; 455/69

(58) Field of Classification Search ........................ None
See application file for complete search history.

(56) References Cited

U.S. PATENT DOCUMENTS

| | | | | |
|---|---|---|---|---|
| 3,706,862 A * | 12/1972 | Chambers, Jr. | ............ | 340/425.1 |
| 5,809,090 A * | 9/1998 | Buternowsky et al. | ........ | 375/347 |
| 6,138,024 A * | 10/2000 | Evans et al. | ................. | 455/452.2 |
| 6,173,162 B1 * | 1/2001 | Dahlman et al. | ................. | 455/69 |
| 6,414,968 B1 * | 7/2002 | Sutterlin et al. | .............. | 370/480 |
| 6,480,525 B1 * | 11/2002 | Parsa et al. | ..................... | 375/141 |
| 6,751,187 B2 * | 6/2004 | Walton et al. | ................. | 370/210 |
| 7,359,311 B1 * | 4/2008 | Paranjpe et al. | .............. | 370/203 |
| 7,433,661 B2 * | 10/2008 | Kogiantis et al. | ........... | 455/226.2 |
| 2003/0003863 A1 * | 1/2003 | Thielecke et al. | .............. | 455/39 |
| 2003/0086371 A1 * | 5/2003 | Walton et al. | .................. | 370/235 |
| 2003/0108062 A1 * | 6/2003 | Agrawal et al. | ............... | 370/463 |
| 2004/0120411 A1 * | 6/2004 | Walton et al. | ................. | 375/260 |
| 2005/0041622 A1 * | 2/2005 | Dubuc et al. | ................... | 370/332 |
| 2005/0085197 A1 * | 4/2005 | Laroia et al. | .................. | 455/101 |
| 2005/0143084 A1 * | 6/2005 | Cheng et al. | ............... | 455/452.2 |
| 2006/0094373 A1 * | 5/2006 | Hottinen | .......................... | 455/73 |
| 2006/0104340 A1 * | 5/2006 | Walton et al. | .................. | 375/227 |
| 2006/0120395 A1 * | 6/2006 | Xing et al. | ..................... | 370/431 |
| 2006/0165191 A1 * | 7/2006 | Lin et al. | ........................ | 375/267 |
| 2006/0234729 A1 * | 10/2006 | Murakami et al. | ............ | 455/462 |
| 2007/0008923 A1 * | 1/2007 | Tandon et al. | .................. | 370/329 |
| 2007/0218950 A1 * | 9/2007 | Codreanu et al. | .......... | 455/562.1 |
| 2008/0152053 A1 * | 6/2008 | Fulghum et al. | .............. | 375/347 |
| 2008/0170533 A1 * | 7/2008 | Cyzs et al. | ..................... | 370/315 |
| 2008/0279125 A1 * | 11/2008 | Hottinen | ........................ | 370/281 |
| 2009/0079881 A1 * | 3/2009 | White et al. | ................... | 348/731 |

* cited by examiner

*Primary Examiner* — Steven H Nguyen

(74) *Attorney, Agent, or Firm* — Donna P. Suchy; Daniel M. Barbieri

(57) ABSTRACT

A system for improving jamming resistance comprising a first node suitable for transmitting a coded packet and a second node suitable for receiving the coded packet. The first node generates a plurality of coded preamble packets and transmits the plurality of coded preamble packets to the second node on a plurality of frequency channels, the second node receives the plurality of coded preamble packets, determines a relative strength for each of the plurality of frequency channels based on a frequency channel condition determined from the transmission of the plurality of coded preamble packets and transmits a frequency channel response to the first node.

20 Claims, 2 Drawing Sheets

SYSTEM AND METHOD FOR IMPROVED JAMMING RESISTANCE FOR HIGH THROUGHPUT POINT TO POINT COMMUNICATION NETWORKS

FIELD OF THE INVENTION

The present invention relates to multi-platform communication systems and more particularly to a method and system for providing improved jamming resistance in such communication systems.

BACKGROUND OF THE INVENTION

Communications systems and particularly communication systems involving wireless communication are built upon a shared medium that makes it easy for adversaries to launch denial of service (DoS) attacks. One form of a DoS attack is targeted at jamming a communication, or preventing sources from communicating. Jamming a communications system involves placing sufficient radio energy in the victim receiver to interfere with or totally obliterate the signal it is attempting to receive. These attacks can be easily accomplished by an adversary by either bypassing MAC-layer protocols, or emitting a radio signal targeted at jamming a particular channel.

Current art does not provide a jam-proof receiver. As a result, receivers must be designed to internally maximize the ratio of signal energy to jamming energy (S/J ratio). Many strategies are employed by wireless devices to evade a MAC/PHY-layer jamming-style denial of service attack. Conventional methods typically utilize classical techniques such as frequency hopping, direct sequence spread spectrum and other variations of digital processing to gain an advantage over a jammer trying to prevent or intercept a transmitted message. Frequency hopping anti-jam techniques generally involve hopping rapidly among many frequencies in an unpredictable sequence. No single frequency is used for a sufficient length of time to allow a jammer to scan the entire spectrum and locate the transmission. Spread spectrum anti-jamming techniques match transmitter, radio signal, and receiver characteristics, thereby preventing a party without a matching transmitter to jam the communication. Secondary modulation schemes may be utilized to spread the radio signal in time or bandwidth beyond that which is required by the information itself. Additionally, channel surfing, a form of spectral evasion that involves legitimate wireless devices changing the channel that they are operating on, may be utilized. Spatial retreats, whereby legitimate mobile devices move away from the locality of the DoS emitter, have also been employed to reduce jamming.

Disadvantageously, while these techniques may have predictable performance against a jammer, the techniques generally do not yield a workable solution when very powerful jammers are utilized and very low message error rates and high throughput are required by the network. Specifically, these techniques prevent adapting to dynamic network connectivity changes and result in less reliable message delivery. Such rigid routing on the basis of frequency or time may also lead to a limited number of high density traffic patterns. Concentrated relay transmissions can lead to easier platform detection by intercept receivers and subsequent jamming will lead to large disruptions of network communications. Also, the overloading of a platform's terminal resources with non-adaptive redundant routing leads to underutilization of network capacity and, hence, increased message delay and error. Specifically, a receiver must attempt to recover an original transmission from the fragments that have been sent redundantly on different frequencies or coded and spread across different frequencies, resulting in high message error rates. It is also desirable to reduce or avoid excessive redundant transmissions because they not only consume precious channel capacity, but result in increases in self-interference levels which, in turn, reduces anti-jamming protection.

Consequently, it would be advantageous if a method existed which provided improved jamming resistance for high throughput point to point communication networks.

SUMMARY OF THE INVENTION

Accordingly, the various embodiments of the present invention are directed to a method for providing improved jamming resistance for high throughput point to point communication networks.

According to an aspect of a first embodiment of the present invention, a system for providing improved jamming resistance for high throughput point to point communication networks is provided. System may comprise first and second nodes such as a transmitting node and a receiving node. Transmitting node may be suitable for transmitting a plurality of packets containing only coded preambles and receiving node may be suitable for receiving the plurality of coded preamble packets. The plurality of coded preamble packets may be transmitted on distinct frequencies to the receiving node. The receiving node may be suitable for determining in real time a frequency condition for each of the distinct frequencies. Frequency condition determination may be utilized by a transmitting node to determine a frequency for transmitting data from the transmitting node to the receiving node. Receiving node may provide a highly coded response to the transmitting node indicating a relative frequency strength for each of the distinct frequencies based on the coded preamble transmissions. System transmitting node may then transmit a data packet to a receiving node based on the response.

According to an aspect of a second embodiment of the present invention, a method for providing improved jamming resistance for high throughput point to point communication networks is provided. Method may comprise generating a plurality of coded preamble packets. Method may transmit the each of the plurality of coded preamble packets from a first node to a second node on a distinct frequency channel. Method may decode each of the plurality of preamble packets at the second node. Method may further comprise transmitting a coded response from the second node to the first node. Coded response may comprise a relative strength determination for each of the plurality of frequencies channels on which each of the plurality of preamble packets is transmitted. Method may then transmit a data packet from the first node to the second node on a frequency channel determined to have no or acceptably low noise.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to presently preferred embodiments of the invention, examples of which are illustrated in the accompanying drawings.

Figure 1:
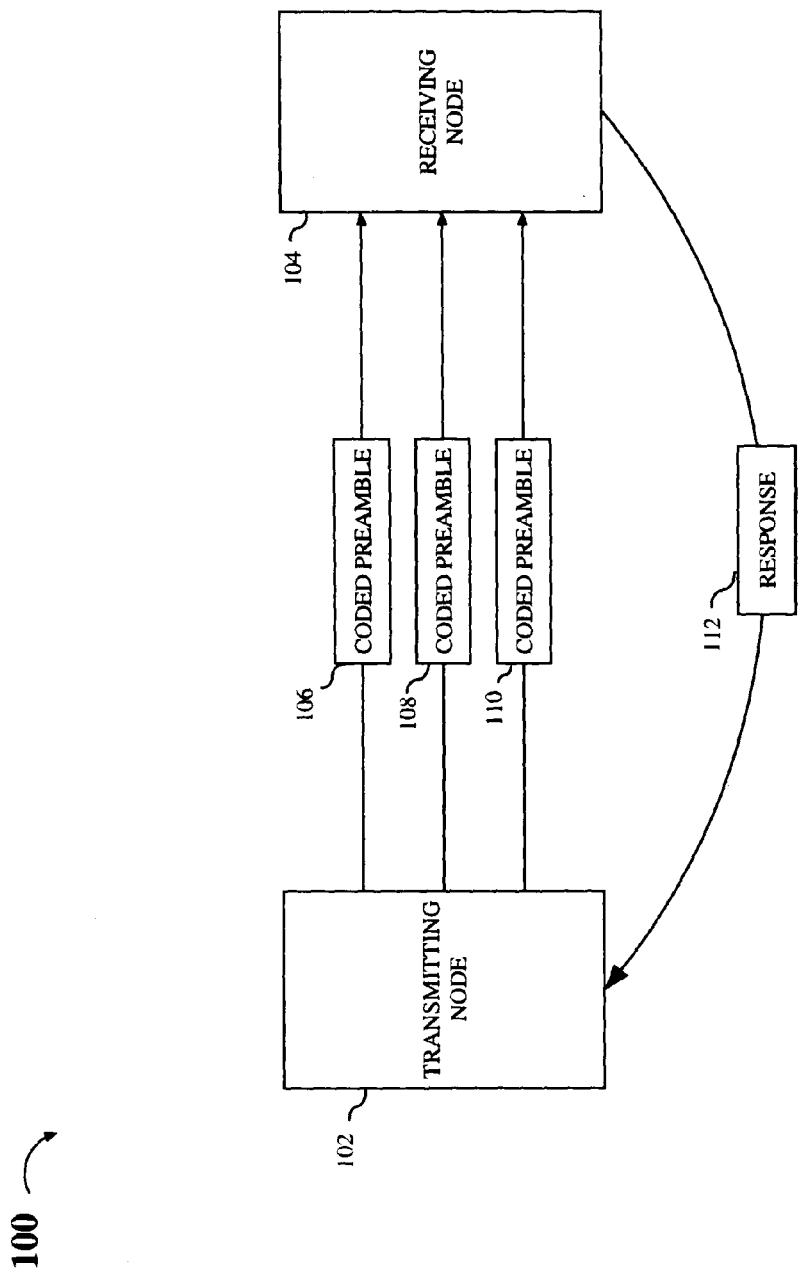
FIG. 1 is a block diagram of a system for providing improved jamming resistance in accordance with the various embodiments of the present invention.

Referring to FIG. 1, a block diagram illustrating a system 100 for improving jamming resistance in accordance with an exemplary embodiment of the present invention is shown. System 100 may comprise a first node 102 and a second node 104. First node 102 may be a transmitting node and second node may be a receiving node. It is contemplated that system 100 may be implemented by from any node in a high throughput point to point communication network to any other node in the network. Transmitting node 102 may be suitable for transmitting a packet to a receiving node. Transmitting node 102 and receiving node 104 may be components of an ad hoc network. Ad hoc network may refer to a collection of communication devices (or nodes) created to communicate with no fixed infrastructure available or pre-determined organization of available links.

Transmitting node 102 may be suitable for generating a plurality of packets 106-110 containing only highly coded preambles. To this end, transmitting node 102 may comprise an encoder and a modulator suitable for coding and modulating data transmissions sent from the transmitting node 102. Each preamble packet 106-110 may be a short, highly coded, predefined sequence of signals suitable for synchronizing the receiver. Specifically, the preamble packets 106-110 provide a mechanism for establishing synchronization ("sync") between packing and unpacking operations during a transmission. To achieve synchronization, a preamble packet may comprise a header with a predefined format and a grouping of pseudo-random number sequences comprising symbols. Preamble packets may be very small, on the order of 2-5 bits.

Preamble packets 106-110 may be transmission security (transec) encoded as is known in the art. Transec preamble packet coding may be accomplished via frequency hopping, spread spectrum or like techniques where the required pseudorandom sequence generation is controlled by a cryptographic algorithm and key. Such keys are known as transmission security keys (TSK). To accomplish transec coding, all radios in a frequency hopping net may be provided the same hopping code, or transec variable, and operated in time synchronization. In the radio transmitter, the frequency may be shifted rapidly in a pseudo-random sequence by shifting the carrier frequency in accordance with the transec variable. The radio receiver employs a code generator utilizing the transec variable to shift the local oscillator frequency so a desired radio signal is always translated to the fixed intermediate frequency (IF). When the receiving node 104 and transmitting node 102 utilize the same transec code and set of frequencies, and are time-synchronized, there may be a matched radio system.

The coded preamble packets 106-110 may be transmitted to a receiving node 104 using any desired modulation scheme. Specifically, coded preamble packets 106-110 may be passed into the network by the transmitting node 102. Transmitting node 102 may comprise the destination address of the receiving node as a parameter. The plurality of coded preamble packets 106-110 may then be routed through the network until the packets 106-110 are delivered to the receiving node 104, or any of the coded preamble packets 106-110 may be discarded within the network if the packet times out or a route to the specified address is not found. The receiving node 104 may or may not be expecting any of the plurality of coded preamble packets 106-110. For example, a ping packet or connection request packet is typically not expected by its recipient. It is contemplated, however, that if connection oriented communication such as TCP/IP (Transmission Control Protocol) has been initiated between the transmitting node 102 and the receiving node 104, each node may expect packets from the other node and actively account for and transmit acknowledgements for the packets.

To transmit the plurality of coded preamble packets 106-110 to a receiving node 104, transmitting node 102 may rapidly examine a plurality of available frequencies across the spectrum in cooperation with the receiving node 104. For instance, system 100 may utilize a channel sounding technique to transmit a plurality of coded preamble packets to a receiving node 104. The channel sounding technique may provide real-time dynamic channel measurement of available frequency channels. One suitable form of channel sounding may employ a narrow band multi-channel digital array processor to achieve a wideband measurement by successive shifting of sounding signal blocks in the frequency domain. The measured sub-bands of narrow bandwidth may be correctly composed to the wideband propagation channel (1 GHz measurement bandwidth) by deploying a channel synthesis strategy. The concept may be extended to the space domain by utilizing an array antenna. Through proper hardware design combined with software approaches, system may achieve complex-valued space-time channel measurement. Alternatively, a rubidium reference and network analyzer may be utilized to achieve channel sounding. It is further contemplated, however, that any appropriate channel sounding technique may be employed with a system 100 in accordance with the various embodiments of the present invention.

The transmitting node 102 may then transmit the plurality of coded preamble packets 106-110 on a plurality of frequencies. For instance, transmitting node 102 may transmit 15 packets containing only coded preambles to the receiving node 104 on 15 distinct frequencies. Time taken to transmit may be negligibly small, such as on the order of a few microseconds. To contrast, prior art methods may provide a conventional waveform transmitting a coded message sequentially on 15 frequencies spread pseudorandomly across an available frequency spectrum. Disadvantageously, however, this technique decreases throughput by a factor of 15, and is not suitable for high throughput point to point network communications.

Receiving node 104 may comprise a demodulator and a decoder such as a preamble-matched filter programmed with the same preamble code utilized by the transmitting node 102 to decode the plurality of transmitted coded preamble packets 106-110. A preamble-matched filter may be configured to receive transmissions from a particular transmitting node 102. When a preamble code is received, it will be detected by the appropriate preamble-matched filter. After detecting a matching preamble code, sufficient receiver timing is acquired to remove the random transec code.

Receiving node 104 may determine the relative strength of each channel utilized to transmit a coded preamble packet. A probe, listen and select technique may be used advantageously to select from an available frequency spectrum a frequency band whose communication quality is suitable for communication at a desired data rate. Coded preamble packets 106-110 are transmitted on different frequencies during a known period of time, and frequency channel quality information is obtained from the probe packets. This quality information may be utilized to select a desirable frequency band. Response may be a 2 or 3 bit response per probed channel to provide transmitter with a channel condition description. Responses from the receiving node 104 may be likewise be highly coded to ensure receipt even in the presence of a jammer. To interfere with a transmission, a jammer may be required to spread jamming signals over the same relatively large proportion of bandwidth to ensure a high statistical probability of intercepting or interfering with a transmission. However, the signal in space has utilized a minimal amount of time forcing the jammer to spread jammer power across the band, and may select a clear or relatively clear channel (i.e., a channel with acceptable noise) through which the transmitting node may transmit a data packet.

Upon processing the receiving coded preamble packets, receiving node 104 may transmit a response 112 to the transmitting node 102. Receiving node 104 may introduce new action frames for providing transmission mode and channel information feedback. Transmission mode feedback may allow the receiving node 104 to inform a transmitting station of the preferred mode for the current channel conditions. The particular choice of mode may be determined in real time by the transmitting node 102 based on frequency channel strength information in the response 112. Channel information feedback provides a mechanism for the transmitting node 102 to learn the precise channel seen at the receiving node 104. This information may either be used as part of a calibration, for systems that assume channel reciprocity, or as direct channel feedback. A receiving node 104 may either provide a complete channel estimate or a null response. Examples of the IEEE 802.11n action frames are Mode Request, Mode Response, multiple-input multiple-output (MIMO) Channel Request and MIMO Channel Response frames.

Transmitting node 102 may then transmit a data packet to the receiving node 104 on a frequency determined to have no or an acceptably low amount of noise interference, thereby being undetected by a jammer.

System 100 may be suitable for implementation with any IP based self-forming ad-hoc networked radio system. Additionally, the foregoing has focused primarily on point-to-point communications in networks of low to medium connectivity which are typical characteristics, for example, of Army ground deployments.

Figure 2:
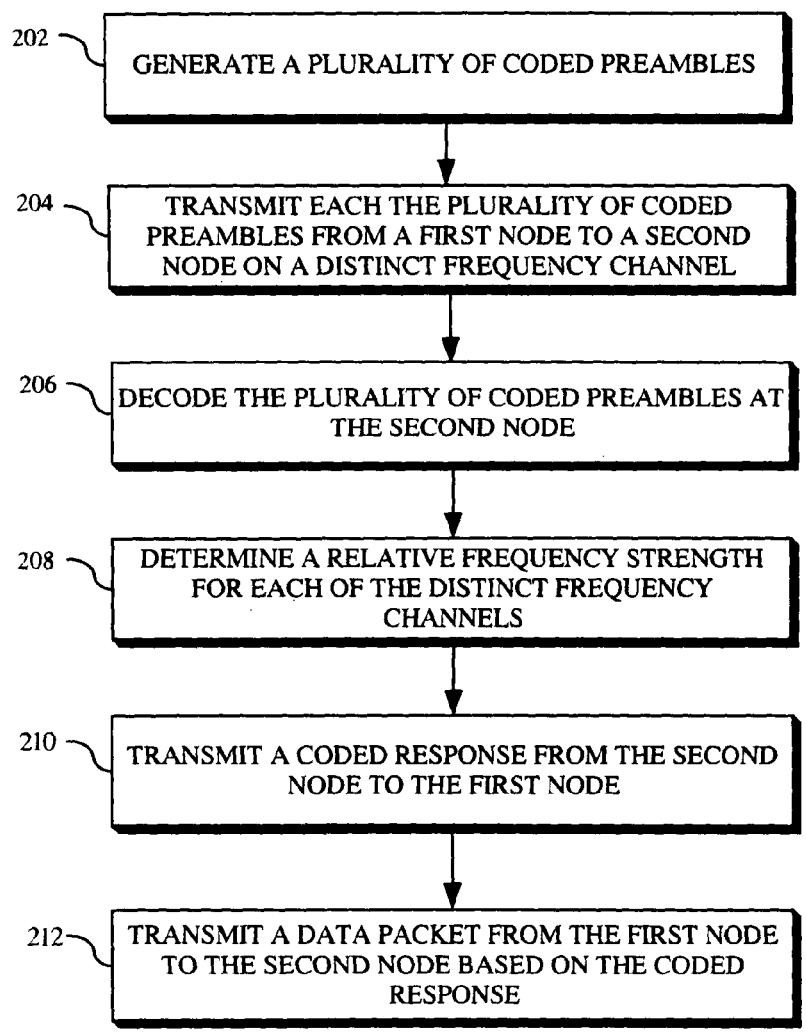
FIG. 2 is a flow diagram illustrating a method for providing improved jamming resistance in accordance in accordance with an exemplary embodiment of the present invention.

Referring to FIG. 2, a flow diagram of a method 200 for providing improved jamming resistance in accordance with an exemplary embodiment of the present invention is shown. Method 200 may comprise generating a plurality of coded preamble packets 202. It is contemplated that the coded preamble packets are transec coded preamble packets. Method 200 may transmit the each of the plurality of coded preamble packets from a first node to a second node on a distinct frequency channel 204. Method 200 may decode each of the plurality of preamble packets at the second node 206. Method 200 may further comprise transmitting a coded response from the second node to the first node 208. Coded response may comprise a relative strength determination for each of the plurality of frequencies channels on which each of the plurality of preamble packets is transmitted. Coded response comprises 2 to 5 bits for each of the plurality of frequency channels. Method 200 may then transmit a data packet from the first node to the second node on a frequency channel determined to have no or acceptably low noise 210.

Method may be implemented in a unicast application whereby a data stream copy is transmitted to each user. A unicast application transmits a copy of every packet to every receiver Traditional Internet protocol (IP) networks rely mostly on the use of unicast protocol (also known as point to point) packet routing and delivery for communications between end stations (for example, a user and a host site). Method may also be suitable for applications requiring low message error rates (MER). Message error rate may refer to the probability that an error is present in a transmitted message. Very low MER rates may be required for certain high security, highly reliable communications.

Method 200 may also improve data transfer efficiency. Generally, if a transmission is attempted on a channel that is corrupted beyond that from which the coding gain is sufficient to recover, the total time of transmission is wasted. However, method 200 may improve the overall efficiency of RF data transfer by recovering and efficiently utilizing the transmission time.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is utilized to program a computer to perform the disclosed function and process of the present invention. The computer-readable medium may include, but is not limited to, any type of conventional floppy disk, optical disk, CD-ROM, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed:

1. A system for improving jamming resistance comprising:
   a first node suitable for transmitting a coded preamble packet including a plurality of highly coded preambles, the first node further including:
   an encoder; and
   a modulator suitable for coding and modulating data transmissions sent from the first node, the first node transmitting the coded packet on a plurality of frequency channels by rapidly examining a plurality of available frequencies across the spectrum; and
   a second node suitable for receiving the coded preamble packet, the second node including:

a demodulator; and a decoder programmed with at least one of the plurality of highly coded preambles utilized by the transmitting node, the second node matching a preamble code of one of the plurality of highly coded preambles and acquiring sufficient receiver timing to remove random transec code included in the coded preamble packet, the second node determining the relative strength of each channel utilized to transmit the coded preamble packet, selecting, via a probe, listen and select technique, a frequency band for transmitting a frequency channel response to the first node and transmitting a response to the first node, the response including new action frames providing transmission mode and channel information feedback including transmission mode feedback allowing the first node to inform a transmitting station of a selected channel mode for current channel conditions, the selected mode determined in real time by the first node based on frequency channel strength information in the channel information feedback, the channel information feedback providing a mechanism for the first node to learn a receiving channel seen at the second node.

2. The system of claim 1, wherein the first node and the second node comprise a point to point communication system.

3. The system of claim 1, wherein the coded preamble packet comprises transmission security (transec) coding.

4. The system of claim 1, wherein the first node rapidly examining a plurality of individual available frequency channels assigns the coded preamble packet to a distinct frequency channel.

5. The system of claim 1, wherein the frequency channel response is suitable for providing the first node with a frequency channel condition description for each of the plurality of frequency channels.

6. The system of claim 1, wherein the frequency channel response comprises 2 to 5 bits for each of the plurality of frequency channels.

7. The system of claim 1, wherein the first node transmits a data packet on a frequency channel determined to have either no or acceptably low noise interference.

8. A method comprising:

generating a plurality of coded preamble packets;

transmitting each of the plurality of coded preamble packets from a first node to a second node on a distinct frequency channel;

decoding the plurality of coded preamble packets at the second node;

determining a relative frequency strength for each the distinct frequency channels, further including selecting, via a probe, listen and select technique, a frequency band for transmitting a frequency channel response to the first node;

transmitting a coded response from the second node to the first node on the selected frequency band, the coded response including new action frames providing transmission mode and channel information feedback including transmission mode feedback allowing the first node to inform a transmitting station of a selected channel mode for current channel conditions, the selected mode determined in real time by the first node based on frequency channel strength information in the channel information feedback, the channel information feedback providing a mechanism for the first node to learn a receiving channel seen at the second node; and transmitting a data packet to the second node on the selected frequency channel.

9. The method of claim 8, wherein the coded preamble packets are transec coded preamble packets.

10. The method of claim 8, further comprising rapidly examining a plurality of individual available frequency channels and assigning each of the plurality of coded preamble packets to a distinct frequency channel of the individual available frequencies.

11. The method of claim 8, wherein the coded response comprises the relative frequency channel strength for each of the distinct frequency channels.

12. The method of claim 11, wherein the coded response comprises 2 to 5 bits for each of the plurality of frequency channels.

13. The method of claim 11, wherein the frequency strength determination further comprises determining a frequency channel condition based on the received transmission of the plurality of coded preamble packets.

14. The method of claim 8, wherein the frequency channel is determined to have either no or acceptably low noise interference.

15. A non-transitory computer readable medium encoded with a computer program having computer-executable instructions executed by a processor for performing a method for reallocating bandwidth, said method comprising:

generating a plurality of coded preamble packets;

transmitting each of the plurality of coded preamble packets from a first node to a second node on a distinct frequency channel;

decoding the plurality of coded preamble packets at the second node;

determining a relative frequency strength for each the distinct frequency channels, further including selecting, via a probe, listen and select technique, a frequency band for transmitting a frequency channel response to the first node;

transmitting a coded response from the second node to the first node on the selected frequency band, the coded response including new action frames providing transmission mode and channel information feedback including transmission mode feedback allowing the first node to inform a transmitting station of a selected channel mode for current channel conditions, the selected mode determined in real time by the first node based on frequency channel strength information in the channel information feedback, the channel information feedback providing a mechanism for the first node to learn a receiving channel seen at the second node; and transmitting a data packet to the second node on the selected frequency channel.

16. The computer readable medium of claim 15, wherein the coded preamble packets are transec coded preamble packets.

17. The computer readable medium of claim 15, further comprising rapidly examining a plurality of individual available frequency channels and assigning each of the plurality of coded preamble packets to a distinct frequency channel of the individual available frequencies.

18. The computer readable medium of claim 15, wherein the coded response comprises the relative frequency channel strength for each of the distinct frequency channels.

19. The computer readable medium of claim 15, wherein the coded response comprises 2 to 5 bits for each of the plurality of frequency channels.

20. The computer readable medium of claim 15, wherein the frequency channel is determined to have either no or acceptably low noise interference.

* * * * *